(12) United States Patent
Park et al.

(10) Patent No.: US 12,014,541 B2
(45) Date of Patent: Jun. 18, 2024

(54) DEVICE FOR MANAGING ENVIRONMENT OF BREEDING FARM

(71) Applicant: LG INNOTEK CO., LTD., Seoul (KR)

(72) Inventors: Seon Hee Park, Seoul (KR); Min Kyu Kim, Seoul (KR); Il Bong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 288 days.

(21) Appl. No.: 17/420,324

(22) PCT Filed: Jan. 2, 2020

(86) PCT No.: PCT/KR2020/000031
§ 371 (c)(1),
(2) Date: Jul. 1, 2021

(87) PCT Pub. No.: WO2020/141888
PCT Pub. Date: Jul. 9, 2020

(65) Prior Publication Data
US 2022/0067377 A1    Mar. 3, 2022

(30) Foreign Application Priority Data

Jan. 2, 2019   (KR) .................... 10-2019-0000227

(51) Int. Cl.
*G06V 20/20*         (2022.01)
*G06F 18/2433*       (2023.01)
(Continued)

(52) U.S. Cl.
CPC .......... *G06V 20/20* (2022.01); *G06F 18/2433* (2023.01); *G06T 7/11* (2017.01); *G06V 40/10* (2022.01); *G06T 2207/10048* (2013.01)

(58) Field of Classification Search
CPC ...... G06V 20/20; G06V 40/10; G06V 10/143; G06V 10/82; G06V 10/25; G06V 20/52;
(Continued)

(56) References Cited

U.S. PATENT DOCUMENTS

| 5,850,969 A | * | 12/1998 | Hong | ...................... G01K 7/42 |
| | | | | 374/E7.042 |
| 2013/0116321 A1 | * | 5/2013 | Lee | ........................... A23L 2/52 |
| | | | | 514/561 |

(Continued)

FOREIGN PATENT DOCUMENTS

| CN | 108917845 A | 11/2018 |
| JP | 6101878 B1 | 3/2017 |

(Continued)

*Primary Examiner* — Amara Abdi
(74) *Attorney, Agent, or Firm* — Birch, Stewart, Kolasch & Birch, LLP

(57) ABSTRACT

Provided according to an embodiment of the present invention is a device for managing the environment of a breeding farm, the device comprising: an imaging unit for capturing a thermal image of the inside of a breeding farm; an object detection unit for detecting an object from the captured image; an area division unit for dividing the captured image into multiple areas; a filtering unit for extracting, from the divided areas, a second area except a first area where the object is detected; and a control unit for comparing the temperature of the second area with a reference temperature to detect an abnormal situation.

19 Claims, 9 Drawing Sheets

(51) Int. Cl.
*G06T 7/11* (2017.01)
*G06V 40/10* (2022.01)

(58) Field of Classification Search
CPC .............. G06F 18/2433; G06T 7/11; G06T 2207/10048; G06T 2207/10024; G06T 2207/10028; G06T 2207/20021; G06T 2207/20081; G06T 2207/20084; G06T 7/12; G06T 7/0012; G06T 7/194; G06T 7/20; G06T 7/62; G06Q 50/02; H04N 5/33; H04N 7/18
See application file for complete search history.

(56) References Cited

U.S. PATENT DOCUMENTS

| | | | | | |
|---|---|---|---|---|---|
| 2013/0259401 | A1* | 10/2013 | Ohki | ........................ | G06T 11/60 382/284 |
| 2015/0063651 | A1* | 3/2015 | Ishihara | ........................ | G06T 7/12 382/110 |
| 2015/0324656 | A1* | 11/2015 | Marks | ........................ | G06V 40/10 383/103 |
| 2017/0061198 | A1* | 3/2017 | Choi | ........................ | G06T 7/73 |
| 2019/0159681 | A1* | 5/2019 | Sugaya | ........................ | G06V 20/52 |
| 2020/0042820 | A1* | 2/2020 | Zavalishin | ........................ | G06T 5/70 |
| 2021/0056324 | A1* | 2/2021 | Chen | ........................ | G06V 10/82 |

FOREIGN PATENT DOCUMENTS

| | | | | |
|---|---|---|---|---|
| KR | 10-1350922 B1 | | 1/2014 | |
| KR | 101350922 | * | 1/2014 | ............ G06T 7/254 |
| KR | 10-2015-0014616 A | | 2/2015 | |
| KR | 10-2016-0044835 A | | 4/2016 | |
| KR | 10-1749860 B1 | | 6/2017 | |
| KR | 101749860 | * | 6/2017 | ............ G05B 23/02 |
| KR | 10-1831928 B1 | | 2/2018 | |
| KR | 10-2018-0033726 A | | 4/2018 | |

* cited by examiner (a)

(b)

DEVICE FOR MANAGING ENVIRONMENT OF BREEDING FARM

CROSS REFERENCE TO RELATED APPLICATIONS

This application is the National Phase of PCT International Application No. PCT/KR2020/000031, filed on Jan. 2, 2020, which claims priority under 35 U.S.C. 119(a) to Patent Application No. 10-2019-0000227, filed in the Republic of Korea on Jan. 2, 2019, all of which are hereby expressly incorporated by reference into the present application.

TECHNICAL FIELD

The present disclosure relates to a device for managing an environment of a breeding farm.

BACKGROUND ART

Livestock reared in groups within a narrow breeding farm are very vulnerable to the spread of communicable diseases. For example, legal infectious diseases such as foot-and-mouth disease and avian influenza are transmitted through the air, so once an outbreak occurs, the social cost of preventing epidemics and blocking transmission is very high, and social anxiety about food is bound to spread rapidly. When abnormal signs are detected in the breeding farm, it is important to isolate the sick animals as soon as possible to prevent the spread of the disease.

Quickly and accurately detecting diseases in the breeding farm needs to maintain an appropriate environment for disease detection. However, there is no method for systematically managing the environment of the breeding farm in order to determine the suitability for detecting abnormal objects, and environmental control in the breeding farm is being performed only to determine the growth environment of livestock.

DISCLOSURE

Technical Problem

The technical problem to be solved by the present disclosure is to provide a breeding farm environment management device for determining the suitability of a poultry breeding environment inside a breeding farm.

Technical Solution

According to an embodiment of the present disclosure, provided is a device for managing an environment of a breeding farm, which includes an imaging unit capturing a thermal image in a breeding farm; an object detection unit detecting an object from the captured image; a region division unit dividing the captured image into a plurality of regions; a filtering unit extracting, from among the divided regions, a second region except a first region where the object is detected; and a control unit detecting an abnormal situation by comparing a temperature of the second region with a reference temperature.

The object detection unit may detect the object by using a temperature value of the thermal image.

The imaging unit may capture an RGB image in the breeding farm.

The object detection unit may detect the object from the RGB image.

The control unit may calculate at least one of an area and a weight of the object by using the thermal image and the RGB image.

The control unit may calculate an entire area of the object by using the RGB image, and calculate a body area of the object excluding feathers by using the thermal image.

The control unit may calculate the weight of the object by using the body area of the object.

The region division unit may adjust a size of a target region for division according to an area of the object.

The region division unit may adjust the size of the target region for division to be smaller as the area of the object increases.

The region division unit may adjust a size of the target region for division depending on at least one of the calculated area and weight of the object.

The control unit may control an air conditioning device by comparing the temperature of the second region with the reference temperature.

When a size ratio occupied by the second region in an entire image is equal to or greater than a reference ratio value, the control unit may calculate an average temperature of the second region as the temperature of the second region.

The object detection unit may detect the object by detecting a movement in the captured image.

Advantageous Effects

The breeding farm environment management device according to the present disclosure can determine the suitability of a poultry breeding environment inside the breeding farm.

In addition, it is possible to control the environment inside the breeding farm to be suitable for poultry breeding.

In addition, the degree of growth of poultry can be grasped.

BEST MODE

Figure 1:
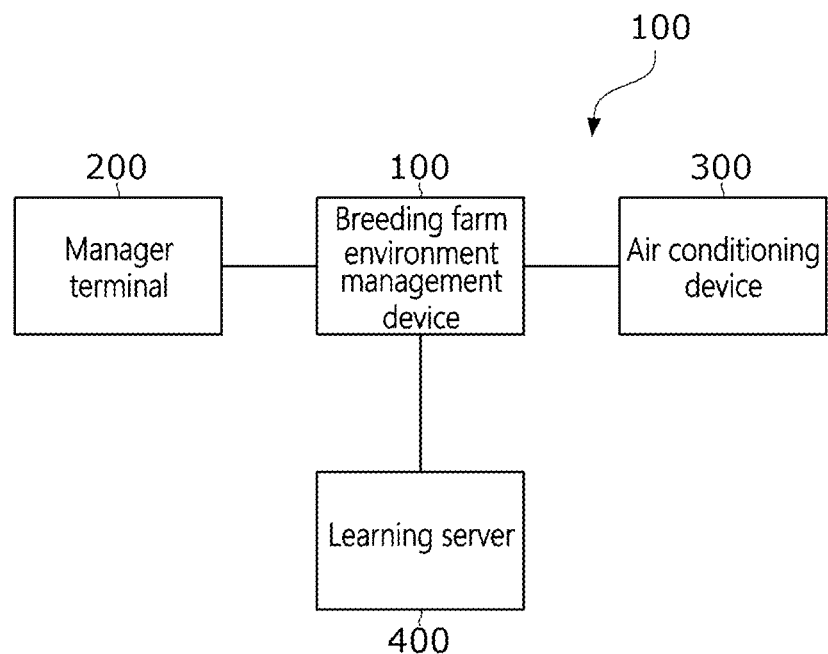
FIG. 1 is a block diagram of an abnormal object detection system according to an embodiment of the present disclosure.

The present disclosure may have various embodiments with several modifications, and specific embodiments are described with reference to accompanying drawings. However, this is not intended to limit the present disclosure to specific embodiments, and it should be understood that all modifications, equivalents and alternatives are included in the subject matter and scope of the present disclosure.

Expressions such as first, second, etc. may indicate various elements regardless of their sequence and/or importance and are used merely to distinguish one element from the others. For example, without departing from the scope of the disclosure, a first element may be referred to as a second element, and similarly a second element may be also referred to as a first element. The term "and/or" includes any one of or any combination of a plurality of enumerated items.

When it is mentioned that a certain element is "coupled with/to" or "connected with/to" another element, it will be understood that the certain element is coupled or connected to another element directly or via any other element. On the other hand, when it is mentioned that a certain element is "directly coupled with/to" or "directly connected with/to" another element, it will be understood that there is no element interposed between both elements.

Terms used in the present disclosure are used only to describe certain embodiments and may not be intended to limit the scope of the present disclosure. The singular expressions may include plural expressions unless the context clearly dictates otherwise. In the disclosure, the terms such as "comprise", "include", and "have" denote the presence of stated elements, components, operations, functions, features, and the like, but do not exclude the presence of or a possibility of addition of one or more other elements, components, operations, functions, features, and the like.

Terms used herein, including technical or scientific terms, may have the same meaning as commonly understood by one of ordinary skill in the art. Among terms used herein, terms defined in a generic dictionary may be interpreted as having the same or similar meaning as the contextual meanings of the related art and, unless explicitly defined herein, may not be interpreted as ideally or excessively formal sense. In some cases, terms, even defined herein, are not construed to exclude embodiments of the disclosure.

Hereinafter, embodiments will be described in detail with reference to accompanying drawings. The same or corresponding components are given the same reference numerals, and overlapping descriptions thereof will be omitted.

Figure 2:
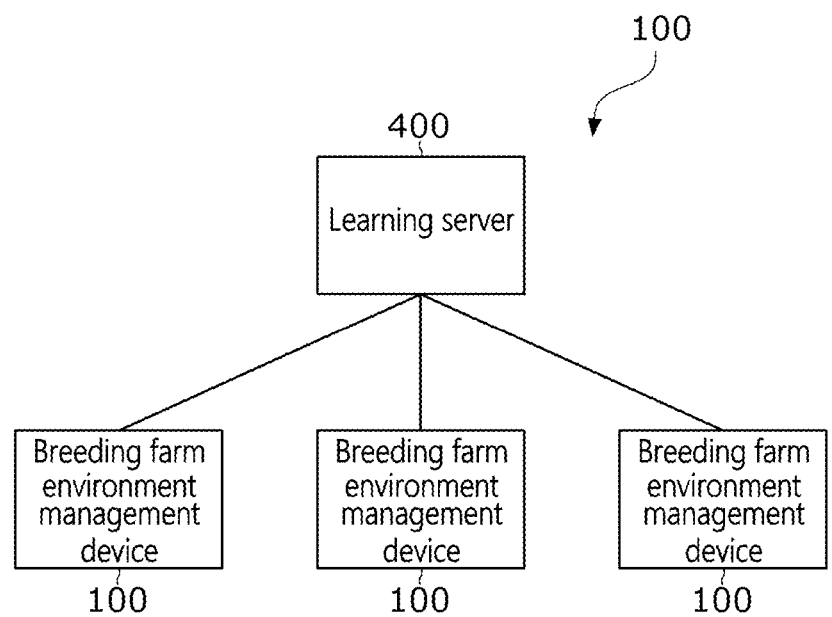
FIG. 2 is a block diagram of a learning system for detecting an abnormal object according to an embodiment of the present disclosure.
Figure 3:
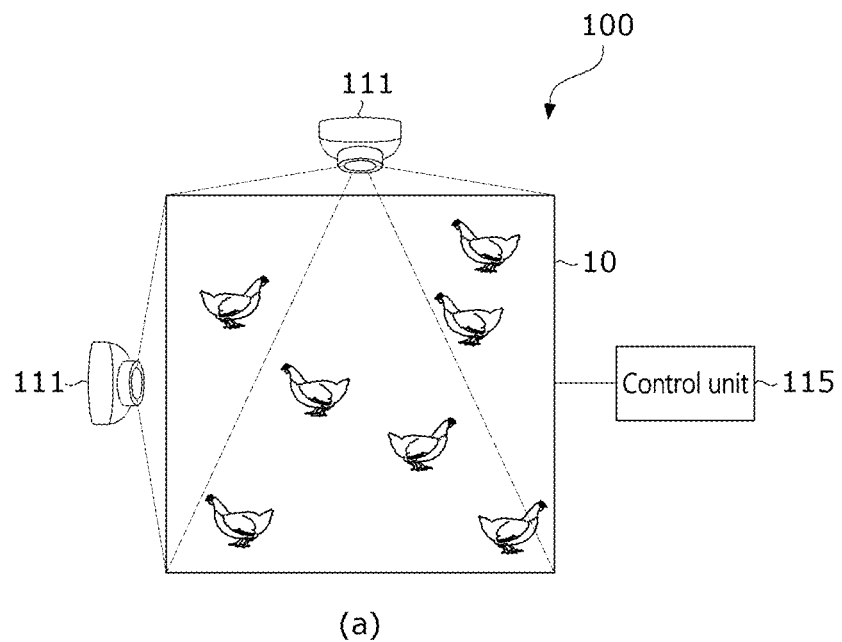
FIG. 3 is a conceptual diagram of a breeding farm environment management device according to an embodiment of the present disclosure.
Figure 3:
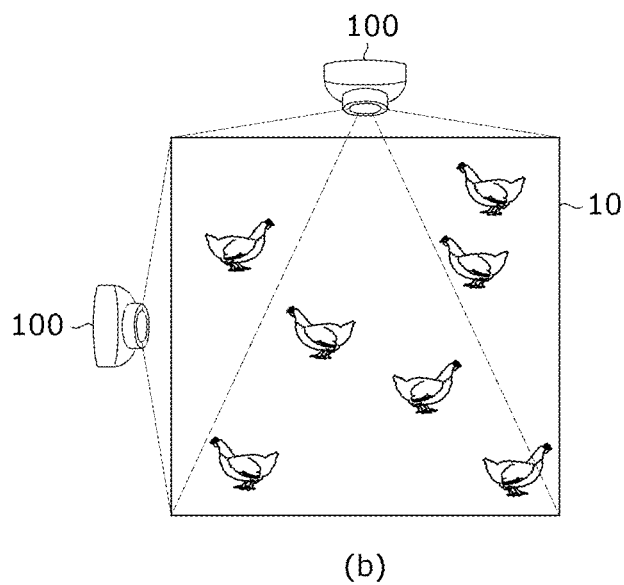

FIG. 1 is a block diagram of a breeding farm environment management system according to an embodiment of the present disclosure, FIG. 2 is a block diagram of a breeding farm environment management system according to an embodiment of the present disclosure, and FIG. 3 is a conceptual diagram of a breeding farm environment management device according to an embodiment of the present disclosure.

Referring to FIGS. 1 to 3, a breeding farm environment management system 1000 according to an embodiment of the present disclosure includes a breeding farm environment management device 100, a manager terminal 200, an air conditioning device 300, and a learning server 400.

The breeding farm environment management system 1000 according to an embodiment of the present disclosure includes a plurality of breeding farm environment management devices 100 and the learning server 400. Here, the plurality of breeding farm environment management devices 100 may be installed in one breeding farm or installed in a plurality of breeding farms.

The breeding farm environment management device 100 may detect the environment in a breeding farm 10 and transmit it to at least one of the manager terminal 200 and the air conditioning device 300. Here, the breeding farm 10 means a livestock barn in which livestock is bred. The livestock may be various types of animals bred in a group in the livestock barn, such as poultry including chickens and ducks, cattle, pigs, and the like.

As shown in (a) of FIG. 3, the breeding farm environment management device 100 may be disposed for each breeding farm 10. The breeding farm environment management device 100 may include a plurality of imaging units 111, which may be disposed at various places in the breeding farm 10. For example, the plurality of imaging units 111 may be disposed on the upper and side portions of the breeding farm 10. The breeding farm environment management device 100 may collect a plurality of image data obtained by the plurality of imaging units 111 and extract environmental data therefrom.

Alternatively, as shown in (b) of FIG. 3, a plurality of breeding farm environment management devices 100 may be disposed in one breeding farm 10. The plurality of breeding farm environment management devices 100 may be disposed at various places in the breeding farm 10, and each breeding farm environment management device 100 may extract environmental data by using each image data obtained by each imaging unit 111. The breeding farm environment management device 100 may communicate with the manager terminal 200 and the air conditioning device 300 by wire or wirelessly. Here, although the breeding farm environment management device 100 is illustrated as communicating with each of the manager terminal 200 and the air conditioning device 300, it is not limited thereto. The breeding farm environment management device 100 may communicate with the manager terminal 200, and the manager terminal 200 may communicate with the air conditioning device 300.

The manager terminal 200 may be a personal computer (PC), a tablet PC, a mobile terminal, etc., and may be used interchangeably with a management server. When the breeding farm environment management device 100 transmits environmental data and abnormal situation information in the breeding farm 10 to the manager terminal 200, the manager may recognize at least one of the environmental data and the abnormal situation information in the breeding farm 10 through a screen outputted to the manager terminal 200. For example, when the breeding farm environment management device 100 captures an abnormal situation in the breeding farm 10 and transmits it to the manager terminal 200, the manager may recognize that an abnormal situation has occurred in the breeding farm 10, through the screen outputted to the manager terminal 200, and then may respond to the abnormal situation at an early stage. In an embodiment, the environmental data may be, for example, growth information of livestock, and humidity, temperature, and concentration information of a specific molecule in the breeding farm 10. In an embodiment, the abnormal situation may be, for example, occurrence of diseased livestock, pregnancy of livestock, or an abnormality in growth period of livestock, in growth information of livestock, or in humidity, temperature, or concentration of a specific molecule in the breeding farm 10.

The air conditioning device 300 is an apparatus for controlling the temperature of the breeding farm 10. When the breeding farm environment management device 100 captures an abnormal temperature in the breeding farm 10 and transmits it to the manager terminal 200, the manager may recognize that an abnormal temperature has occurred in the breeding farm 10, through the screen outputted to the manager terminal 200, and then may normalize the temperature in the breeding farm 10 by controlling the air conditioning device 300. Alternatively, when the breeding farm environment management device 100 detects an abnormal temperature in the breeding farm 10 and directly transmits it to the air conditioning device 300, the air conditioning device 300 may directly normalize the temperature in the breeding farm 10. For example, when the temperature in the breeding farm 10 is lower or higher than a temperature suitable for livestock to live, the movement of the livestock tends to be slowed. Therefore, the breeding farm environment management device 100, the manager terminal 200, or the air conditioning device 300 may detect an abnormal temperature in the breeding farm 10 and normalize the temperature in the breeding farm 10.

The air conditioning device 300 may adjust the humidity of the breeding farm 10. When an abnormality in humidity in the breeding farm 10 occurs, the breeding farm environment management device 100 may control the air conditioning device 300 to normalize the humidity in the breeding farm 10.

The breeding farm environment management device 100 transmits data for learning to the remote learning server 400, and control the environment of the breeding farm by applying parameters received from the learning server 400 to an algorithm for the breeding farm environment management.

According to an embodiment of the present disclosure, the learning server 400 receives data for learning from the plurality of breeding farm environment management devices 100, and extracts parameters by re-training the data for learning. The learning server 400 may learn the data for learning by using, for example, a deep learning technique, but it is not limited thereto. The learning server 400 may learn the data for learning by using various techniques, and extract parameters.

Here, the breeding farm environment management device 100 may be referred to as a local machine, and the learning server 400 may collect data for learning from a plurality of breeding farm environment management devices installed in a plurality of breeding farms.

The breeding farm environment management device 100 according to an embodiment of the present disclosure pre-processes image data, selects data for learning, and transmits only the selected data for learning to the learning server 400. This may reduce communication traffic between the breeding farm environment management device 100 and the learning server 400, and also reduce the amount of computation of the learning server 400.

Figure 4:
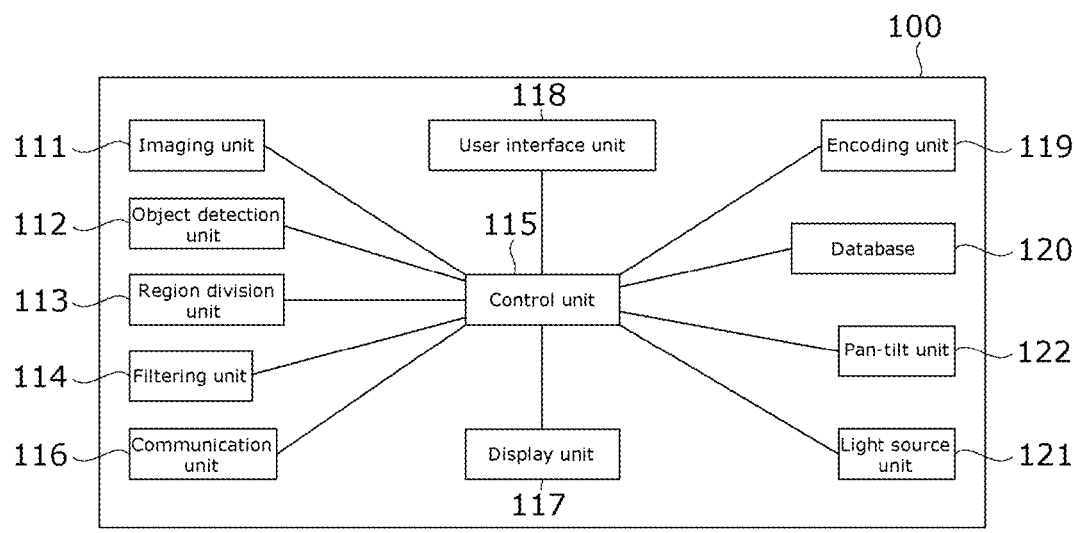
FIG. 4 is a block diagram of a breeding farm environment management device according to an embodiment of the present disclosure.

FIG. 4 is a block diagram of a breeding farm environment management device according to an embodiment of the present disclosure.

Referring to FIGS. 1 to 4, the breeding farm environment management device 100 includes an imaging unit 111, an object detection unit 112, a region division unit 113, a filtering unit 114, a control unit 115, a communication unit 116, a display unit 117, a user interface unit 118, an encoding unit 119, a database 120, a light source unit 121, and a pan-tilt unit 122. However, according to an embodiment of the present disclosure, at least one of the imaging unit 111, the display unit 117, the user interface unit 118, the light source unit 121, and the pan-tilt unit 122 may be omitted. Here, the control unit 111 and the encoding unit 119 may be implemented with a computer processor or chip, the database 120 may be referred to as a memory, and the communication unit 116 may be referred to as an antenna or a communication processor.

The breeding farm environment management device 100 may be manufactured in the form of a separate module and included in a data collection device (not shown) or the management server 200. Alternatively, the breeding farm environment management device 100 may be implemented as an independent product in the form of a separate device. When the breeding farm environment management device 100 is applied as a module or device separate from the imaging unit, the breeding farm environment management device 100 may receive image data from the imaging unit 111 through the communication unit 116. Also, the object detection unit 112 may be included in the control unit 115 and implemented as a single processor. In an embodiment of the present disclosure, functions of the object detection unit 112 and the control unit 115 will be separately described for convenience of description.

In addition, when the plurality of breeding farm environment management devices 100 are disposed in the breeding farm, the rest except for one breeding farm environment management device 100 may be configured to perform only some functions of the breeding farm environment management device 100. That is, one breeding farm environment management device 100 is set as a main device, collects image data captured by the other breeding farm environment management devices 100, detects environmental data, and performs a function of communicating with the manager terminal. On the other hand, the other breeding farm environment management device 100 may be configured to perform only a function of transmitting image data captured through the imaging unit 111 to the main device.

The imaging unit 111 may capture a thermal image inside the breeding farm. The imaging unit may include a thermal imaging camera module capable of detecting infrared rays radiated from an object, measuring a temperature, and visually displaying the temperature.

In addition, the imaging unit 111 may capture a RGB image inside the breeding farm. The imaging unit 111 may include an image sensor that captures a subject by using a complementary metal-oxide semiconductor (CMOS) module or a charge coupled device (CCD) module. In this case, an input image frame is provided to the CMOS module or CCD module in the imaging unit 111 through a lens, and the CMOS module or CCD module converts an optical signal of the subject passing through the lens into an electrical signal (image data) and outputs it.

That is, the imaging unit 111 may be composed of the image sensor capable of capturing an RGB image and the thermal imaging camera module capable of capturing a thermal image.

The imaging unit 111 may generate image data by capturing an image containing a plurality of objects. In an embodiment of the present disclosure, the plurality of objects may refer to poultry being bred in the breeding farm. In an embodiment of the present disclosure, the image data generated by the imaging unit 111 may be referred to as original data, an original image, a captured image, and the like.

The imaging unit 111 may generate a plurality of image data by using a plurality of sequentially captured images. For example, the imaging unit 111 may generate first image data by capturing a first image containing a plurality of objects, and may generate second image data by capturing a second image containing a plurality of objects. Each of the first image and the second image may be images continuously captured in time, and one image data may refer to a single frame. The imaging unit 111 may generate the first image data and the second image data by using the first image and the second image that are sequentially captured.

The imaging unit 111 may include a fisheye lens or wide-angle lens having a wide viewing angle. Therefore, it is possible for one imaging unit 111 to capture the entire space inside the breeding farm.

Also, the imaging unit 111 may be a depth camera. The imaging unit 111 may be driven in any one of various depth recognition schemes, and an image captured by the imaging unit 111 may contain depth information. The imaging unit 111 may be, for example, a Kinect sensor. The Kinect sensor, which is a depth camera of structured light projection type, may acquire three-dimensional information of a scene by projecting a defined pattern image through the use of a projector or a laser and acquiring a pattern-projected image through a camera. This Kinect sensor include an infrared emitter that irradiates a pattern by using an infrared laser, and an infrared camera that captures an infrared image. An RGB camera that functions like a general webcam is placed between the infrared emitter and the infrared camera. In addition, the Kinect sensor may further include the pan-tilt unit 122 for adjusting the angle of the camera and the microphone arrangement.

The basic principle of the Kinect sensor is that when a laser pattern irradiated from the infrared emitter is projected onto and reflected from an object, a distance to a surface of the object is obtained using the position and size of the pattern at the point of reflection. According to this principle, the imaging unit 111 may generate image data including depth information for each object by irradiating a laser pattern into a space within the breeding farm and sensing the laser pattern reflected from the object.

In an embodiment, the thermal image and the RGB image may be image data composed of N×M pixels.

Figure 5:
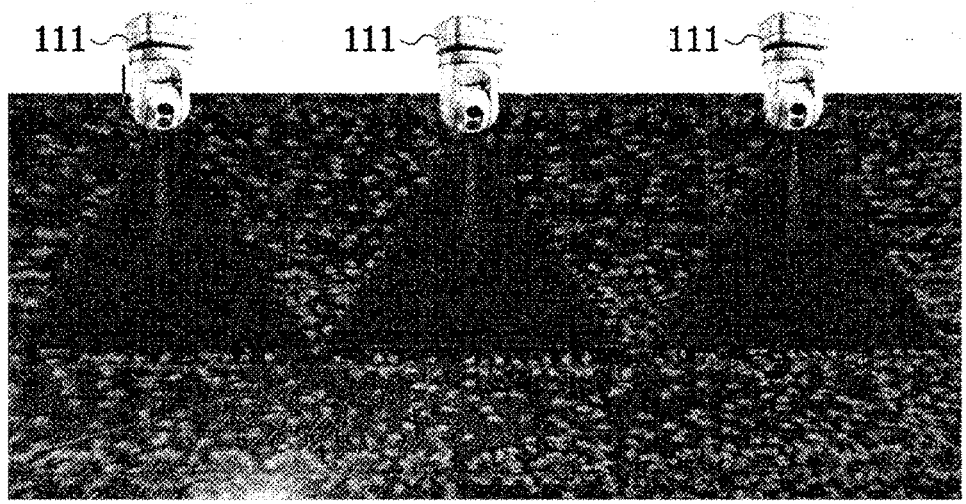
FIG. 5 is a diagram illustrating an operation of an imaging unit according to an embodiment of the present disclosure.

FIG. 5 is a diagram illustrating an operation of an imaging unit according to an embodiment of the present disclosure.

Referring to FIG. 5, a region in which a relatively narrow range is captured indicates an angle of view of the thermal imaging camera, and a region in which a wide range is captured indicates an angle of view of the RGB camera. In an embodiment, in order to correct a difference in the angle of view between the cameras, the horizontal viewing angle and the vertical viewing angle of the RGB camera are set to 152 degrees and 80 degrees, respectively, and the horizontal viewing angle and the vertical viewing angle of the thermal imaging camera are set to 48 degrees and 37 degrees, respectively. Alternatively, the viewing angle of each camera may be set variously depending on environmental conditions.

Figure 6:
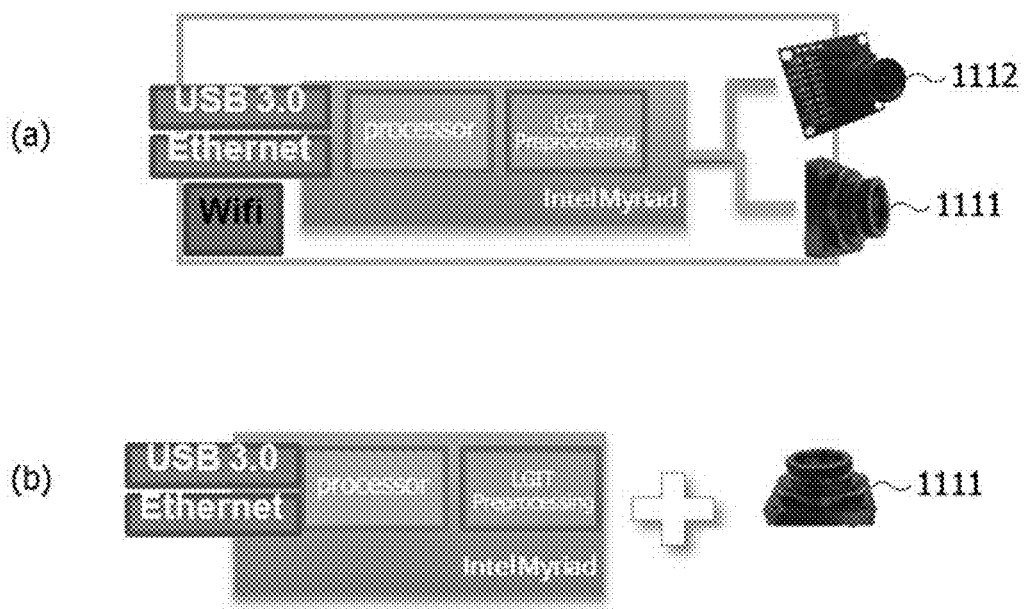
FIG. 6 is a diagram illustrating a configuration of an imaging unit according to an embodiment of the present disclosure.

FIG. 6 is a diagram illustrating a configuration of an imaging unit 111 according to an embodiment of the present disclosure. Referring to (a) of FIG. 6, a thermal imaging camera module 1111 and an RGB camera module 1112 may be implemented through one processing device. Referring to (b) of FIG. 6, the thermal imaging camera module 1111 may be separately provided.

Referring back to FIGS. 1 to 4, the object detection unit 112 may detect an object from a captured image.

For example, the object detection unit 112 may detect an object by using a temperature value of a thermal image. If the object is a chicken, the body temperature of the chicken is about 41 degrees, which is higher than a ground temperature inside the breeding farm. Therefore, through the thermal image, the object detection unit 112 may detect that the object exists in a pixel having a temperature higher than a predetermined threshold temperature. In this case, the threshold value may be predetermined in consideration of the general body temperature of the object and the temperature of the internal environment of the breeding farm.

Also, for example, the object detection unit 112 may detect an object from an RGB image. The object detection unit 112 may detect an outline of an object from image data, compare the detected outline with an outward appearance of an animal object stored in advance in the database 120, and thereby detect, as an animal object, an object having an outline matching the stored outward appearance of the animal object. In this case, the outward appearance of the animal object stored in the database 120 may be the outward appearance of at least one or more animal objects, and the object detection unit 112 may detect the object having the matched outline as the animal object as descried above and also determine the type of the animal object.

Also, for example, the object detection unit 112 may extract a feature point of an object in image data, and, when the extracted feature point matches a feature point of an animal object stored in advance in the database 120 with a proximity greater than or equal to a threshold, detect the object in the image data as an animal object. In this case, the object detection unit 112 may extract feature points from images of two objects to be compared, and use a SIFT (Scale Invariant Feature Transform) or SURF (Speeded Up Robust Features) algorithm that matches the extracted feature descriptors of the two objects.

Also, for example, the object detection unit 112 may detect an animal object based on outlines of objects in image data. Specifically, the object detection unit 112 may generate an edge image by detecting outlines of objects in image data, generate a background edge image by detecting an outline from foreground image data that is a background image of the breeding farm stored in advance in the database 120, and detect an animal object from a different image obtained by subtracting the background edge image from the edge image. In this case, using gradient information of an image data frame, the object detection unit 112 generates the edge image by detecting, as an edge, the outline of an object appearing in the frame. Here, the gradient information is a value generated from difference values between adjacent pixels among predetermined pixels in the frame and refers to the sum of absolute values of differences, and the edge refers to a boundary line between objects using the gradient information.

Also, the object detection unit 112 may generate a background edge image by detecting an edge of an object corresponding to the background from the previously captured image data of the foreground in the breeding farm. In this case, the background edge image may be an image obtained by detecting the outlines of objects in a predetermined region as background edges, or an image obtained by comparing a plurality of image data frames of the foreground in the breeding farm and detecting as the background edge the outline of the object that appears repeatedly more than a predetermined number of times.

Also, the object detection unit 112 may detect an object from image data by using an object detection classifier. In this case, the object detection classifier is learned by constructing a training DB from images of animal objects previously captured with different external environments or postures of the animal objects. The object detection classifier generates a DB of animal objects through various learning algorithms including SVM (Support Vector Machine), neural network, and AdaBoost algorithm. Specifically, the object detection unit 112 detects an edge of an object corresponding to the foreground from previously captured image data of the background in the breeding farm, applies the edge of the foreground object detected from the image data, applies the object detection classifier to a region of the image data to which the edge of the foreground object is applied, and thereby detects the animal object. For example, the object detection unit 112 may detect the object by detecting a movement in the captured image. In this case, the object detection unit 112 may detect the object by detecting a movement in the thermal image or the RGB image. Using single image data or a plurality of consecutive image data, the object detection unit 112 may detect a movement at a specific point, a specific object, or a specific pixel on a distribution map.

The object detection unit 112 may detect the movement of a moving object by using the Dense Optical Flow scheme. The object detection unit 112 may detect the movement for each pixel by calculating motion vectors for all pixels on image data. In case of the Dense Optical Flow scheme, because motion vectors are calculated for all pixels, the detection accuracy is improved, but the amount of computation is relatively increased. Therefore, the Dense Optical Flow scheme may be applied to a specific region requiring very high detection accuracy, such as a breeding farm suspected of having an abnormal situation or a breeding farm with a very large number of objects.

Alternatively, the object detection unit 112 may detect the movement of a moving object by using the Sparse Optical Flow scheme. The object detection unit 112 may detect the movement by calculating motion vectors for only some featural pixels that are easy to track motion, such as an edge in an image. Although the Sparse Optical Flow scheme reduces the amount of computation, it may obtain results only for a limited number of pixels. Therefore, the Sparse Optical Flow scheme may be applied to a breeding farm with a small number of objects or to a specific region in which overlapping objects do not appear.

Alternatively, the object detection unit 112 may detect the movement of a moving object by using the Block Matching scheme. The object detection unit 112 may detect the movement by dividing an image equally or unequally and calculating motion vectors for the divided region. The Block Matching scheme reduces the amount of computation because of calculating motion vectors for each divided region, but the detection accuracy may be relatively low because the result of calculating motion vectors is obtained for each divided region. Therefore, the Block Matching scheme may be applied to a breeding farm with a small number of objects or to a specific region in which overlapping objects do not appear.

Alternatively, the object detection unit 112 may detect the movement of a moving object by using the Continuous Frame Difference scheme. The object detection unit 112 may compare continuous image frames for each pixel, calculate a value corresponding to a difference, and thereby detect the movement. Because the Continuous Frame Difference scheme detects the movement by using a difference value between frames, the overall amount of computation is reduced, but the detection accuracy of a bulky object or an overlapping object may be relatively low. In addition, the Continuous Frame Difference scheme cannot distinguish between a background image and a non-moving object, so accuracy may be relatively low. Therefore, the Continuous Frame Difference scheme may be applied to a breeding farm with a small number of objects or to a specific region in which overlapping objects do not appear.

Alternatively, the object detection unit 112 may detect the movement of a moving object by using the Background Subtraction scheme. The object detection unit 112 may compare continuous image frames for each pixel in a state where a background image is initially learned, calculate a value corresponding to a difference, and thereby detect the movement. Because the Background Subtraction scheme learns the background image in advance, it is possible to distinguish the background image from a non-moving object. Therefore, the amount of computation is increased because a separate process of filtering the background image, but accuracy is improved. Therefore, the Background Subtraction scheme be applied to a specific region requiring very high detection accuracy, such as a breeding farm suspected of having an abnormal situation or a breeding farm with a very large number of objects. In the Background Subtraction scheme, the background image may be continuously updated.

Also, the object detection unit 112 may be trained to detect an object from a captured image. The object detection unit 112 may include a computer-readable program. This program may be stored in a recording medium or storage device that can be executed by a computer. The processor in the computer may read a program stored in the recording medium or storage device, execute the program, that is, the learned model, to calculate input information, and output the operation result.

The input of the object detection unit 112 may be one or a plurality of image data obtained by capturing the inside of the breeding farm, and the output of the object detection unit 112 may be image data in which an object is detected.

The object detection unit 112 may include a first neural network that is to learn a correlation between an image inside the breeding farm and the probability of object existence by using the image inside the breeding farm as an input layer and causing the object-detected image data to become an output layer.

The first neural network is an example of a deep learning algorithm designed to display detected objects on image data. The first neural network may be an algorithm that inputs image data to a learning machine based on a convolutional network and then outputs data indicating object-located regions so as to be distinguished. In this case, image data obtained by capturing the inside of the breeding farm becomes the input layer of the first neural network, and the first neural network may learn a correlation with an object existing in the image data inside the breeding farm. In addition, the output layer of the first neural network may be image data in which an object detected from the image data inside the breeding farm is indicated for each region.

The object detection unit 112 may detect a movement on a distribution map by using an appropriate scheme according to environments in the breeding farm and external settings.

The region division unit 113 may divide the captured image into a plurality of regions. Each region may consist of at least one pixel, and the respective regions may have the same size or different sizes.

The region division unit 113 may adjust the size of a target region for division depending on the area of an object. As the object grows, the area the object occupies in the image increases. Therefore, the region division unit 113 may reduce the size of the target region for division as the area of the object increases. That is, by performing a preprocessing process of reducing the size of the target region for division as the object grows, it is possible to more clearly and precisely distinguish a region where the object exists and a region where the object does not exist.

Figure 8:
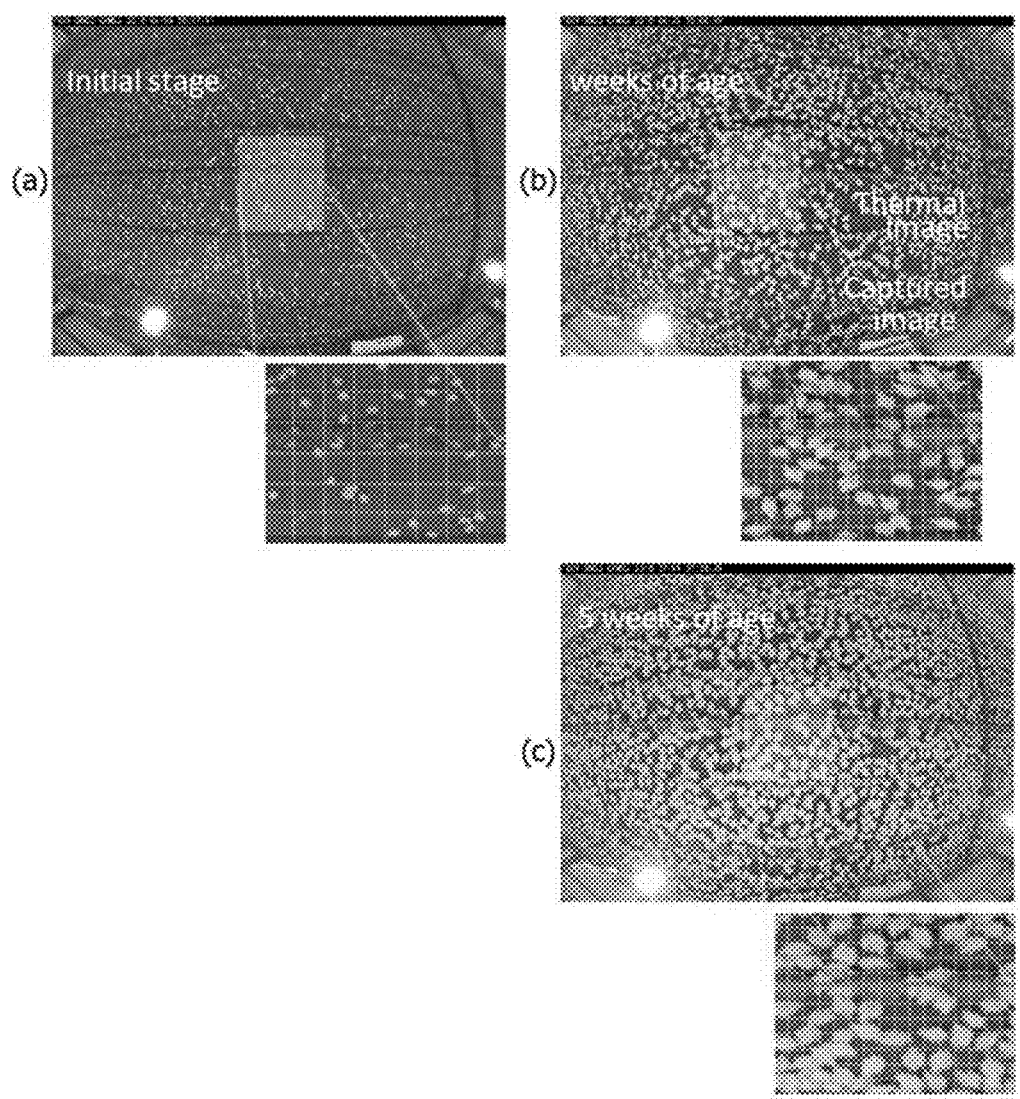
FIG. 8 is a diagram illustrating an operation of a region division unit according to an embodiment of the present disclosure.

FIG. 8 is a diagram illustrating an operation of a region division unit according to an embodiment of the present disclosure. Referring to (a) of FIG. 8, for example, the region division unit 113 may adjust the size of the target region for division to 10×10 (pixels) from the initial stage when an object is placed in the breeding farm to two weeks later. Referring to (b) and (c) of FIG. 8, the region division unit may adjust the size of the target region for division to 5×5 (pixel), which is smaller than before, from three weeks of age to just before shipment.

The region division unit 113 may adjust the size of the target region for division according to at least one of the calculated area and weight of the object. The region division unit 113 may actively adjust the size of the target region for division, based on at least one of the area and weight of the object calculated by the control unit 115. In this case, the size of the target region for division may be variably adjusted depending on the growth of the object and the size of the actual area occupied in the image.

Figure 7:
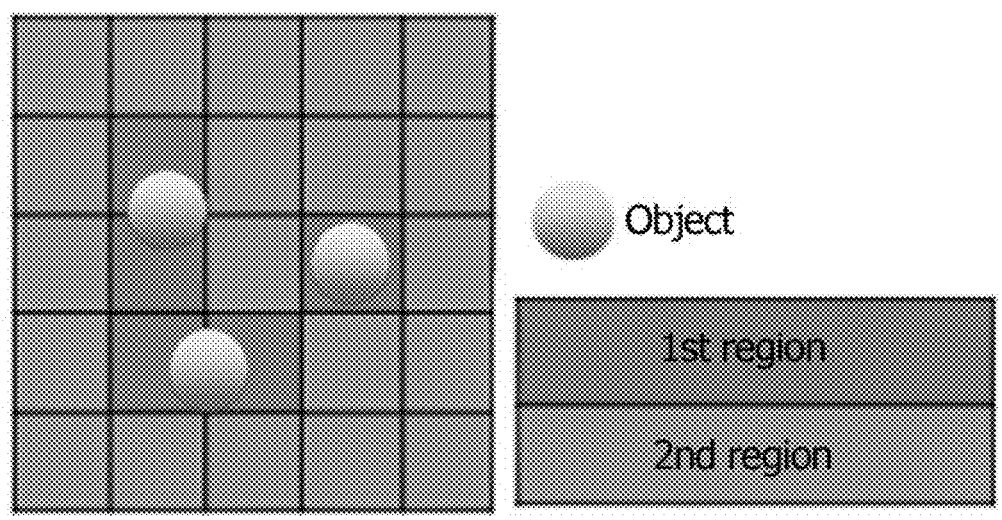
FIG. 7 is a diagram illustrating an operation of a filtering unit according to an embodiment of the present disclosure.

The filtering unit 114 may extract a second region, excepting a first region in which an object is detected, from among the divided regions. FIG. 7 is a diagram illustrating an operation of a filtering unit 114 according to an embodiment of the present disclosure. Referring to FIG. 7, the filtering unit may extract the second region excluding the first region in which an object is detected, in order to extract only an image of the ground inside the breeding farm. When determining the temperature of the ground inside the breeding farm, the temperature of an object becomes noise and may give an error in the determination process. Thus, the filtering unit 114 may detect the temperature of the ground inside the breeding farm in a state where all regions in which objects are detected are excluded, and perform a preprocessing process for determining the environment inside the breeding farm.

The control unit 115 may detect an abnormal situation by comparing the temperature of the second region with a reference temperature. The reference temperature may refer to a range of an appropriate temperature inside the breeding farm for breeding objects, and in an embodiment, the appropriateness of the breeding environment may be determined using the temperature of the ground of the breeding farm.

When the temperature of the second region is out of the reference temperature range, the control unit 115 may determine that an abnormal situation occurs. The control unit 115 may compare the temperature of each second region with the reference temperature range and thereby determine whether an abnormal situation occurs in each second region. Alternatively, the control unit 115 may calculate an average value of the temperatures of the second regions, compare it with the reference temperature range, and thereby determine whether an abnormal situation occurs in the entire breeding farm. Alternatively, the control unit 115 may compare the temperature of each second region with the temperature of an adjacent second region and determine that an abnormal situation occurs in the second region that is out of a critical range.

In this case, the control unit 115 may calculate the temperature of the second region according to the ratio of the size occupied by the second region in the entire image. For example, when the size ratio occupied by the second region in the entire image is equal to or greater than a reference ratio value, the control unit 115 may calculate the average temperature of the second region as the temperature of the second region. In an embodiment, the reference ratio value may be 15%.

The control unit 115 may control the air conditioning device by comparing the temperature of the second region with the reference temperature. The control unit 115 may output a command to control the air conditioning device so that the temperature of the second region is within the reference temperature range. In this case, the reference temperature range may be set depending on various factors such as the growth degree of the object, the season, and other external environments, and may be set with reference to the temperature of the breeding farm ground accumulated in the database 120.

For example, the control unit 115 may set the reference temperature range so that the temperature in the breeding farm is maintained at 32 to 35° C. during the first one week, is lowered by about 3° C. during the next one week, and reaches the final temperature of 21 to 22° C. at 21-24 days of age. In this case, the control unit 115 may control the air conditioning device so that the temperature of several cm above the ground comes within the reference temperature range.

The control unit 115 may control the air conditioning device so that the relative humidity is maintained between 70 and 80% together with the temperature.

Also, the control unit 115 may calculate at least one of the area and weight of an object by using the thermal image and the RGB image.

The control unit 115 may calculate the entire area of the object by using the RGB image, and may calculate the body area of the object excluding feathers by using the thermal image. The control unit 115 may calculate the weight of the object by using the body area of the object. Using the RGB image can distinguish the overall appearance of the object, including feathers. However, feathers are not considered when the weight of the object is calculated. Therefore, the control unit 115 may calculate only the body area of the object excluding feathers by using the thermal image, and accurately calculate the weight of the object by using the calculated body area. Using the calculated weight of the object, the control unit 115 may determine the growth level of the object and determine the shipping time. For example, the control unit 115 may average the calculated weights of objects and select as the shipping time a case where the average weight exceeds a target value.

Alternatively, the control unit 115 may calculate environmental data of the breeding farm by using a machine learning method. The control unit 115 may learn a result of calculating environmental data according to region division data and object detection data of image data as a training set, and then calculate environmental data by analyzing region division data and object detection data of image data inputted later. In an embodiment, the environmental data may include at least one of a temperature of the second region, a result of determining whether an abnormal situation occurs, and a control command for the air conditioning device.

The control unit 115 may be trained to generate environmental data by using the region division data and the object detection data. The control unit 115 may include a computer-readable program. This program may be stored in a recording medium or storage device that can be executed by a computer. The processor in the computer may read a program stored in the recording medium or storage device, execute the program, that is, the learned model, to calculate input information, and output the operation result.

The input of the control unit 114 may be thermal image data on which a preprocessing process including object detection and region division has been performed. The output of the control unit 114 may be environmental data that includes at least one of a temperature of the second region, a result of determining whether an abnormal situation occurs, and a control command for the air conditioning device.

The control unit 115 may include a second neural network that is to learn a correlation between the preprocessed thermal image data and at least one of a temperature of the second region, a result of determining whether an abnormal situation occurs, and a control command for the air conditioning device, by using the preprocessed thermal image data as an input layer and causing the environmental data to become an output layer.

The control unit 115 may control in general the breeding farm environment management device 100. The control unit 115 may perform operations of the breeding farm environment management device 100 by, for example, executing commands stored in the user interface unit 118 or the database 120.

Alternatively, the control unit 115 may control various operations of the breeding farm environment management device 100 by using commands received from the manager terminal.

The control unit 115 may control the pan-tilt unit 122 of the breeding farm environment management device 100 to perform tracking capture. The pan-tilt unit 122 may control a capturing area of the imaging unit 111 by driving two motors, i.e., pan (horizontal direction) and tilt (vertical direction). The pan-tilt unit 122 may adjust the orientation direction of the imaging unit 111 in order to capture a specific area under the control of the control unit 115. Also, the pan-tilt unit 122 may adjust the orientation direction of the imaging unit 111 in order to track a specific object under the control of the control unit 115.

The communication unit 116 may perform data communication with at least one of other breeding farm environment management device, the manager terminal, or the learning server. For example, the communication unit 116 may perform data communication by using a telecommunication technology such as Wireless LAN (WLAN), Wi-Fi, Wireless Broadband (Wibro), World Interoperability for Microwave Access (Wimax), High Speed Downlink Packet Access (HSDPA), IEEE 802.16, Long Term Evolution (LTE), Wireless Mobile Broadband Service (WMBS), and the like.

Alternatively, the communication unit 116 may perform data communication by using a short-range communication technology such as Bluetooth, Radio Frequency Identification (RFID), Infrared Data Association (IrDA), Ultra Wideband (UWB), Zigbee, Near Field Communication (NFC), and the like. In addition, the communication unit 116 may perform data communication by using a wired communication technology such as USB communication, Ethernet, serial communication, an optical/coaxial cable, and the like.

For example, the communication unit 116 may perform data communication with other breeding farm environment management device by using the short-range communication technology, and perform data communication with the manager terminal or the learning server by using the telecommunication technology, However, it is not limited thereto, and various communication technologies may be used in consideration of various matters of the breeding farm.

The communication unit 116 may transmit image data captured by the imaging unit 111 to the manager terminal, transmit environmental data calculated by the control unit 115 to the manager terminal, or transmit a matching result of the image data and the environmental data to the manager terminal. When the control unit 115 detects the occurrence of an abnormal situation, the communication unit 116 may transmit this information to the manager terminal as an alarm.

Data transmitted through the communication unit 116 may be compressed data encoded through the encoding unit 119.

The display unit 117 may include at least one of a liquid crystal display (LCD), a thin film transistor-liquid crystal display (TFT-LCD), an organic light-emitting diode (OLED), a flexible display, a 3D display, and an e-ink display.

The display unit 117 may output the image data captured by the imaging unit 111 to the screen, or output the image data and a detection result of the environmental data to the screen.

Also, the display unit 117 may output various user interfaces or graphic user interfaces on the screen.

The user interface unit 118 generates input data for controlling the operations of the breeding farm environment management device 100. The user interface unit 118 may include a key pad, a dome switch, a touch pad, a jog wheel, a jog switch, and the like. When the display unit 117 and the touch pad form a layered structure for a touch screen, the display unit 117 may be used as an input device in addition to an output device.

The user interface unit 118 may receive various commands for the operations of the breeding farm environment management device.

The encoding unit 119 encodes the image data captured by the imaging unit 111 or the processed image data processed through the control unit 115 into a digital signal. For example, the encoding unit 119 may encode such image data in accordance with H.264, H.265, Moving Picture Experts Group (MPEG), and Motion Joint Photographic Experts Group (M-JPEG) standards.

The database 120 may include at least one storage medium among a flash memory type, a hard disk type, a multimedia card micro type, a card type memory (e.g., SD or XD memory, etc.), a magnetic memory, a magnetic disk, an optical disk, a random access memory (RAM), a static random access memory (SRAM), a read-only memory (ROM), an electrically erasable programmable read-only memory (EEPROM), and a programmable read-only memory (PROM). Also, the breeding farm environment management device 100 may operate a web storage that performs a storage function of the database 120 on the Internet, or may operate in connection with the web storage.

The database 120 may store image data captured by the imaging unit 111 and may store image data for a predetermined period in the past.

In addition, the database 120 may store data and programs necessary for the operations of the breeding farm environment management device 100, and store an algorithm, and parameters applied thereto, necessary for the control unit 115 to extract environmental data.

Also, the database 120 may store various user interfaces (UIs) or graphic user interfaces (GUIs).

The light source unit 121 may irradiate light in a direction directed under the control of the control unit 115. For example, the light source unit 121 may include at least one laser diode (LD) and at least one light emitting diode (LED). The light source unit 121 may emit light in various wavelength bands under the control of the control unit 115.

For example, the light source unit 121 may irradiate light in an infrared wavelength band for night capturing. Alternatively, the light source unit 121 may irradiate light in the ultraviolet wavelength band for photochemotherapy of livestock in the breeding farm.

Figure 9:
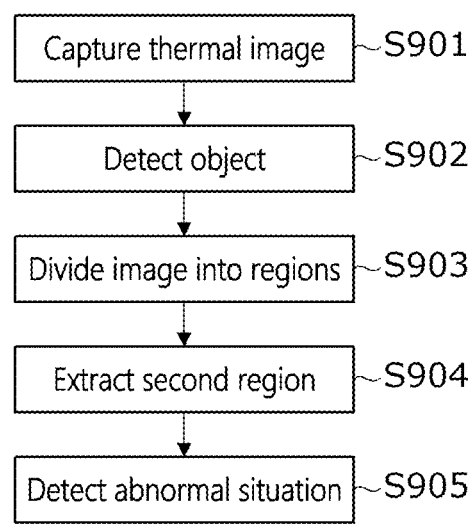
FIGS. 9 to 11 are flow diagrams of a breeding farm environment management method according to an embodiment of the present disclosure.

FIG. 9 is a flow diagram of a breeding farm environment management method according to an embodiment of the present disclosure.

First, at S901, the imaging unit captures a thermal image of the inside of the breeding farm.

Next, at S902, the object detection unit detects an object in the captured image. The object detection unit detects the object by using a temperature value of the thermal image. Alternatively, the object detection unit detects the object by detecting a movement in the captured thermal image.

Next, at S903, the region division unit divides the captured image into a plurality of regions. At this time, the region division unit adjusts the size of the target region for division to be smaller as the area of an object increases. Each region may consist of at least one pixel, and the respective regions may have the same size or different sizes.

Next, at S904, the filtering unit extracts a second region, excepting a first region in which an object is detected, from among the divided regions. The filtering unit extracts the second region excluding the first region in which an object is detected, in order to extract only an image of the ground inside the breeding farm.

Next, at S905, the control unit detects an abnormal situation by comparing the temperature of the second region with the reference temperature. The control unit compares the temperature of each second region with the reference temperature range and thereby determines whether an abnormal situation occurs in each second region. Alternatively, the control unit calculates an average value of the temperatures of the second regions, compares it with the reference temperature range, and thereby determines whether an abnormal situation occurs in the entire breeding farm. Alternatively, the control unit compares the temperature of each second region with the temperature of an adjacent second region and determines that an abnormal situation occurs in the second region that is out of a critical range.

Figure 10:
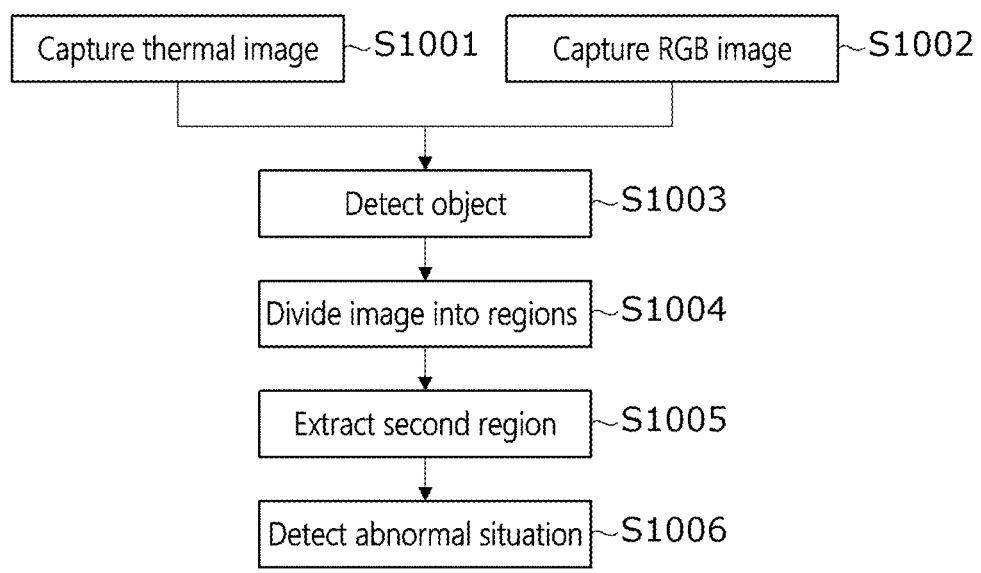

FIG. 10 is a flow diagram of a breeding farm environment management method according to an embodiment of the present disclosure.

First, at S1001 and S1002, the imaging unit captures a thermal image and a RGB image of the inside of the breeding farm.

Next, at S1003, the object detection unit detects an object in the captured image. The object detection unit detects the object from the RGB image according to an object detection algorithm. Alternatively, the object detection unit detects the object by detecting a movement in the captured thermal image. In this case, the object detection unit detects the object by detecting a movement in the thermal image or RGB image.

Next, at S1004, the region division unit divides the captured image into a plurality of regions. At this time, the region division unit adjusts the size of the target region for division to be smaller as the area of an object increases. Each region may consist of at least one pixel, and the respective regions may have the same size or different sizes.

Next, at S1005, the filtering unit extracts a second region, excepting a first region in which an object is detected, from among the divided regions. The filtering unit extracts the second region excluding the first region in which an object is detected, in order to extract only an image of the ground inside the breeding farm.

Next, at S1006, the control unit detects an abnormal situation by comparing the temperature of the second region with the reference temperature. The control unit compares the temperature of each second region with the reference temperature range and thereby determines whether an abnormal situation occurs in each second region. Alternatively, the control unit calculates an average value of the temperatures of the second regions, compares it with the reference temperature range, and thereby determines whether an abnormal situation occurs in the entire breeding farm. Alternatively, the control unit compares the temperature of each second region with the temperature of an adjacent second region and determines that an abnormal situation occurs in the second region that is out of a critical range.

Figure 11:
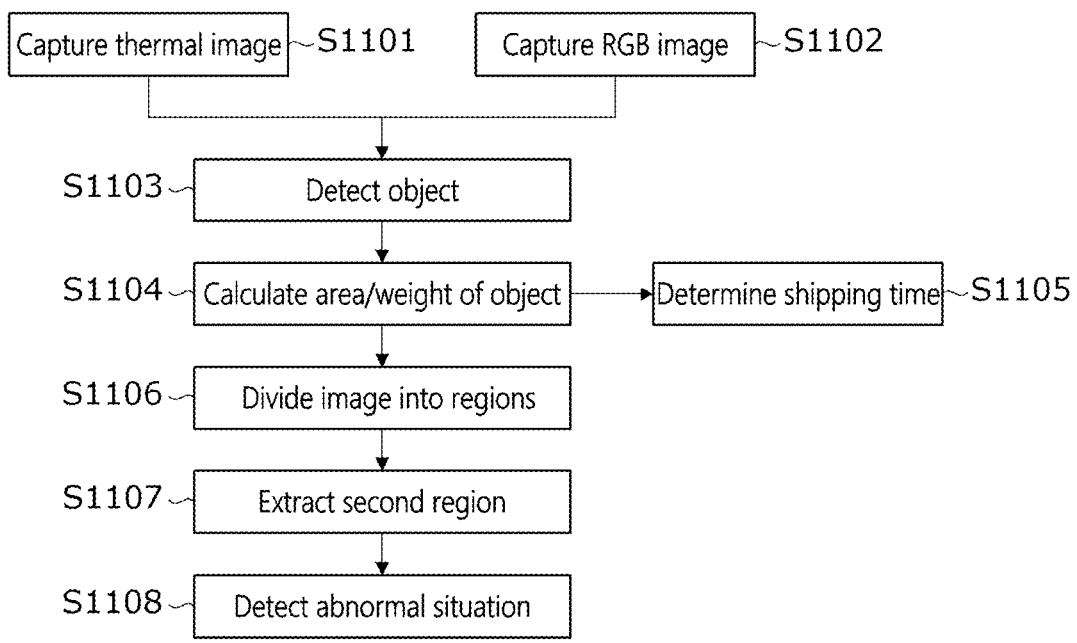

FIG. 11 is a flow diagram of a breeding farm environment management method according to an embodiment of the present disclosure.

First, at S1101 and S1102, the imaging unit captures a thermal image and a RGB image of the inside of the breeding farm.

Next, at S1103, the object detection unit detects an object in the captured image.

At S1104, the control unit calculates the area and weight of the object by using the thermal image and the RGB image. The control unit calculates the entire area of the object by using the RGB image, and calculates the body area of the object excluding feathers by using the thermal image.

In this case, at S1105, the control unit may determine a shipping time by using the area and weight of the object.

Next, at S1106, the region division unit divides the captured image into a plurality of regions. At this time, the region division unit adjusts the size of the target region for division depending on at least one of the calculated area and weight of the object. The region division unit actively adjusts the size of the target region for division, based on at least one of the area and weight of the object calculated by the control unit.

Next, at S1107, the filtering unit extracts a second region, excepting a first region in which an object is detected, from among the divided regions. The filtering unit extracts the second region excluding the first region in which an object is detected, in order to extract only an image of the ground inside the breeding farm.

Next, at S1108, the control unit detects an abnormal situation by comparing the temperature of the second region with the reference temperature. The control unit compares the temperature of each second region with the reference temperature range and thereby determines whether an abnormal situation occurs in each second region. Alternatively, the control unit calculates an average value of the temperatures of the second regions, compares it with the reference temperature range, and thereby determines whether an abnormal situation occurs in the entire breeding farm. Alternatively, the control unit compares the temperature of each second region with the temperature of an adjacent second region and determines that an abnormal situation occurs in the second region that is out of a critical range.

The term "unit", as used in the present embodiments, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

While the disclosure has been particularly shown and described with reference to exemplary embodiments thereof, it will be understood by those skilled in the art that various changes in form and details may be made therein without departing from the scope of the subject matter as defined by the appended claims.

The invention claimed is:

1. A device for managing an environment of a breeding farm, comprising:
   an imaging unit capturing a thermal image in a breeding farm;
   an object detection unit detecting an object from the captured image;
   a region division unit dividing the captured image into a plurality of regions;
   a filtering unit extracting, from among the divided regions, a second region except a first region where the object is detected; and
   a control unit calculating an average temperature of the second region as a temperature of the second region when a size ratio occupied by the second region in the captured image is equal to or greater than a reference value and detecting an abnormal situation by comparing the temperature of the second region with a reference temperature.

2. The device of claim 1, wherein the object detection unit detects the object by using a temperature value of the thermal image.

3. The device of claim 1, wherein the imaging unit captures an RGB image in the breeding farm.

4. The device of claim 3, wherein the object detection unit detects the object from the RGB image.

5. The device of claim 3, wherein the control unit calculates at least one of an area and a weight of the object by using the thermal image and the RGB image.

6. The device of claim 5, wherein the control unit calculates an entire area of the object by using the RGB image, and calculates a body area of the object excluding feathers by using the thermal image.

7. The device of claim 6, wherein the control unit calculates the weight of the object by using the body area of the object.

8. The device of claim 1, wherein the region division unit adjusts a size of a target region for division according to an area of the object.

9. The device of claim 8, wherein the region division unit adjusts the size of the target region for division to be smaller as the area of the object increases.

10. The device of claim 5, wherein the region division unit adjusts a size of the target region for division depending on at least one of the calculated area and weight of the object.

11. The device of claim 1, wherein the control unit controls an air conditioning device by comparing the temperature of the second region with the reference temperature.

12. The device of claim 1, wherein the object detection unit detects the object by detecting a movement in the captured image.

13. The device of claim 1, wherein the control unit adjusts a range of the reference temperature according to a number of days that the object is placed in the breeding farm.

14. The device of claim 1, wherein the control unit compares the temperature of each second region with the reference temperature and thereby determines whether an abnormal situation occurs in each second region.

15. The device of claim 1, wherein the control unit calculates an average value of the temperature of the second region, compares the average value with the reference temperature, and thereby determines whether an abnormal situation occurs in the entire breeding farm.

16. The device of claim 1, wherein the control unit compares the temperature of the second region with a temperature of an adjacent second region and thereby determines that an abnormal situation occurs in the second region that is out of a critical range.

17. The device of claim 1, wherein the object detection unit includes a neural network that is to learn a correlation between an image inside the breeding farm and a probability of object existence by using the image inside the breeding farm as an input layer and causing object-detected image data to become an output layer.

18. The device of claim 1, wherein the region division unit adjusts a size of a target region for division to be reduced as the object grows.

19. The device of claim 18, wherein the region division unit adjusts the size of the region from an initial stage when the object is placed in the breeding farm to two weeks later, to be greater than the size of the region from three weeks of age to just before shipment.

* * * * *